US011011071B1

(12) United States Patent
Goyal et al.

(10) Patent No.: US 11,011,071 B1
(45) Date of Patent: May 18, 2021

(54) INTERACTIVE LEARNING SYSTEM AND A METHOD

(71) Applicant: Mobilizar Technologies Pvt Ltd, Bengaluru (IN)

(72) Inventors: Vivek Goyal, Bengaluru (IN); Dinesh Advani, Bengaluru (IN)

(73) Assignee: Mobilizar Technologies Pvt Ltd, Bangalore (IN)

( * ) Notice: Subject to any disclaimer, the term of this patent is extended or adjusted under 35 U.S.C. 154(b) by 0 days.

(21) Appl. No.: 16/872,510

(22) Filed: May 12, 2020

(30) Foreign Application Priority Data

Mar. 30, 2020 (IN) .............................. 202041013877

(51) Int. Cl.
*G09B 15/02* (2006.01)
*G09B 15/08* (2006.01)
*G06K 9/46* (2006.01)
*G09B 5/02* (2006.01)

(52) U.S. Cl.
CPC ......... *G09B 15/023* (2013.01); *G06K 9/4604* (2013.01); *G09B 5/02* (2013.01); *G09B 15/08* (2013.01)

(58) Field of Classification Search
CPC ....... G09B 15/023; G09B 5/08; G06K 9/4604
See application file for complete search history.

(56) References Cited

U.S. PATENT DOCUMENTS

| 3,771,240 | A | * | 11/1973 | Matui | G09B 7/063 434/339 |
| 4,070,944 | A | * | 1/1978 | del Castillo | G04F 5/02 84/478 |
| 4,557,694 | A | * | 12/1985 | Nelson | G09B 7/08 273/460 |
| 5,466,158 | A | * | 11/1995 | Smith, III | A63F 9/183 273/236 |
| 6,225,545 | B1 | * | 5/2001 | Suzuki | G09B 15/023 84/464 R |
| 6,365,815 | B2 | * | 4/2002 | Ishida | G09B 15/003 715/708 |
| 6,416,326 | B1 | * | 7/2002 | Oh | G09B 17/006 434/178 |

(Continued)

FOREIGN PATENT DOCUMENTS

EP 1593096 B1 9/2009
EP 3545497 A1 10/2019

*Primary Examiner* — Robert W Horn
(74) *Attorney, Agent, or Firm* — Jason C. Cameron

(57) ABSTRACT

An interactive learning system and method are provided. The method includes projecting at least one multimedia on a display screen interface upon selection of the at least one multimedia by a user, receiving one or more images representative of the at least one movement of corresponding one or more interactive tools captured by an image capturing unit in real time, enabling an interaction with at least one multimedia being displayed on the display screen interface upon having at least one movement of the one or more interactive tools on pad, identifying a pattern formed by the one or more received images representative of the at least one movement of the one or more interactive tools, analysing the pattern identified via an image processing technique, enabling an interaction of the one or more interactive tools with the at least one multimedia being displayed on the display screen interface in real time.

20 Claims, 9 Drawing Sheets

(56) References Cited

U.S. PATENT DOCUMENTS

| | | | | |
|---|---|---|---|---|
| 7,754,955 B2* | 7/2010 | Egan | ............ | G09B 15/023 |
| | | | | 84/600 |
| 8,008,563 B1* | 8/2011 | Hastings | ............ | G09B 15/04 |
| | | | | 84/479 A |
| 8,062,126 B2 | 11/2011 | Marks et al. | | |
| 8,342,529 B2* | 1/2013 | Snow | ............ | G07F 17/323 |
| | | | | 273/292 |
| 8,697,972 B2* | 4/2014 | Dripps | ............ | G09B 15/023 |
| | | | | 84/470 R |
| 8,872,013 B2* | 10/2014 | Cooper | ............ | G06F 3/046 |
| | | | | 84/615 |
| 9,159,185 B2* | 10/2015 | Snow | ............ | A63F 1/10 |
| 9,183,755 B2* | 11/2015 | Shi | ............ | G09B 15/023 |
| 9,378,654 B2* | 6/2016 | Batiste | ............ | G09B 15/023 |
| 10,102,767 B2* | 10/2018 | Bayadzhan | ............ | G09B 15/023 |
| 10,354,625 B2* | 7/2019 | Wei | ............ | G10H 1/0016 |
| 10,758,828 B1* | 9/2020 | Howell | ............ | A63F 1/02 |
| 2008/0302233 A1* | 12/2008 | Ding | ............ | G09B 15/023 |
| | | | | 84/609 |
| 2015/0095883 A1* | 4/2015 | Shi | ............ | G06F 11/362 |
| | | | | 717/109 |
| 2018/0277008 A1* | 9/2018 | Kojo | ............ | G06F 3/0484 |

\* cited by examiner

INTERACTIVE LEARNING SYSTEM AND A METHOD

This International Application claims priority from a complete patent application filed in India having Patent Application No. 202041013877, filed on Mar. 30, 2020 and titled "AN INTERACTIVE LEARNING SYSTEM AND A METHOD".

FIELD OF INVENTION

Embodiment of a present invention relates to an interactive system, and more particularly, to an interactive learning system and method.

BACKGROUND

With a linear growth in technology, electronic devices are becoming more user friendly. One of the major applications of technology in recent days is education and entertainment; and one such entertainment is gaming Various games and toys have been developed in which a computing device interacts with a physical location of a game controller to keep the games engaged.

Game controllers come in various forms such as keyboards, mouse, gamepads, steering wheels, light guns, joysticks, playing pieces or the like which is used in various platforms such as virtual reality, augmented reality, flat screens or the like to experience 2-dimensional or 3-dimensional effect of the game. Further there have been an attempt to construct various board games with the combination of flat screens such as a display screen interface and interactive pieces or interactive tools such as patterns, counts, links, instruments, or the like.

In this context, users are in constant exposure to devices having the display screen interface making it desirable to provide new technologies, which can enhance the interactive experience with touch screen devices and their existing game controllers and devices having such an interaction.

In one approach, augmented reality or virtual reality is used in this regard which keeps the user engaged. However, such systems make a user lose the hands-on with the interaction associated to education or entertainment display screen interface. Also, user experience in such an approach is limited to a single approach, thereby making the conventional approach less reliable. In addition, accuracy of tracking the interactive tools in real time is a challenge as intervention of noise from any of the communication means may hamper the same or create a time delay in tracing the interaction of the game controller with the computing device.

Hence, there is a need for an improved interactive learning system and method in order to address the aforementioned issues.

BRIEF DESCRIPTION

In accordance with an embodiment of the present disclosure, an interactive learning system is provided. The system includes a pad including a plurality of sections. The plurality of sections includes a first section including a slot. A display screen interface comprising an image capturing unit is housed within the slot. The plurality of sections also includes a second section with a pre-defined magnetic pattern. The pre-defined magnetic pattern is embedded within the pad. The system also includes one or more interactive tools which includes magnetic material. The one or more interactive tools are configured to enable an interaction with at least one multimedia being displayed on the display screen interface upon having at least one movement of the one or more interactive tools on the second section of the pad. The system also includes one or more processors operatively coupled to the pad. The one or more processors incudes a multimedia projection module configured to project the at least one multimedia on the display screen interface upon selection of the at least one multimedia by a user. The one or more processors also includes an image receiving module configured to receive one or more images representative of the at least one movement of the corresponding one or more interactive tools captured by the image capturing unit in real time. The one or more processors also includes an image identification module configured to identify a pattern formed by the one or more images representative of the at least one movement of the corresponding one or more interactive tools received by the image receiving module. The one or more processors also includes an image analysis module configured to analyse the pattern identified by the image identification module via an image processing technique. The one or more processors also includes a tool interaction module configured to enable an interaction of the one or more interactive tools with the at least one multimedia being displayed on the display screen interface in real time based on the pattern analysed by the image analysis module.

In accordance with an embodiment of the present disclosure, a method for interactive learning is provided. The method includes projecting at least one multimedia on a display screen interface upon selection of the at least one multimedia by a user. The method also includes receiving one or more images representative of the at least one movement of corresponding one or more interactive tools captured by an image capturing unit in real time. receiving the one or more images representative of the at least one movement of corresponding one or more interactive tools includes enabling an interaction with at least one multimedia being displayed on the display screen interface upon having at least one movement of the one or more interactive tools on pad. The method also includes identifying a pattern formed by the one or more received images representative of the at least one movement of the corresponding one or more interactive tools. The method also includes analysing the pattern identified via an image processing technique. The method also includes enabling an interaction of the one or more interactive tools with the at least one multimedia being displayed on the display screen interface in real time based on the pattern analysed.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, multiple components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to an interactive learning system and method. As used herein, the term 'interactive learning' is defined as a type of interaction developed to learn, educate or entertain a user through different tools.

Figure 1:
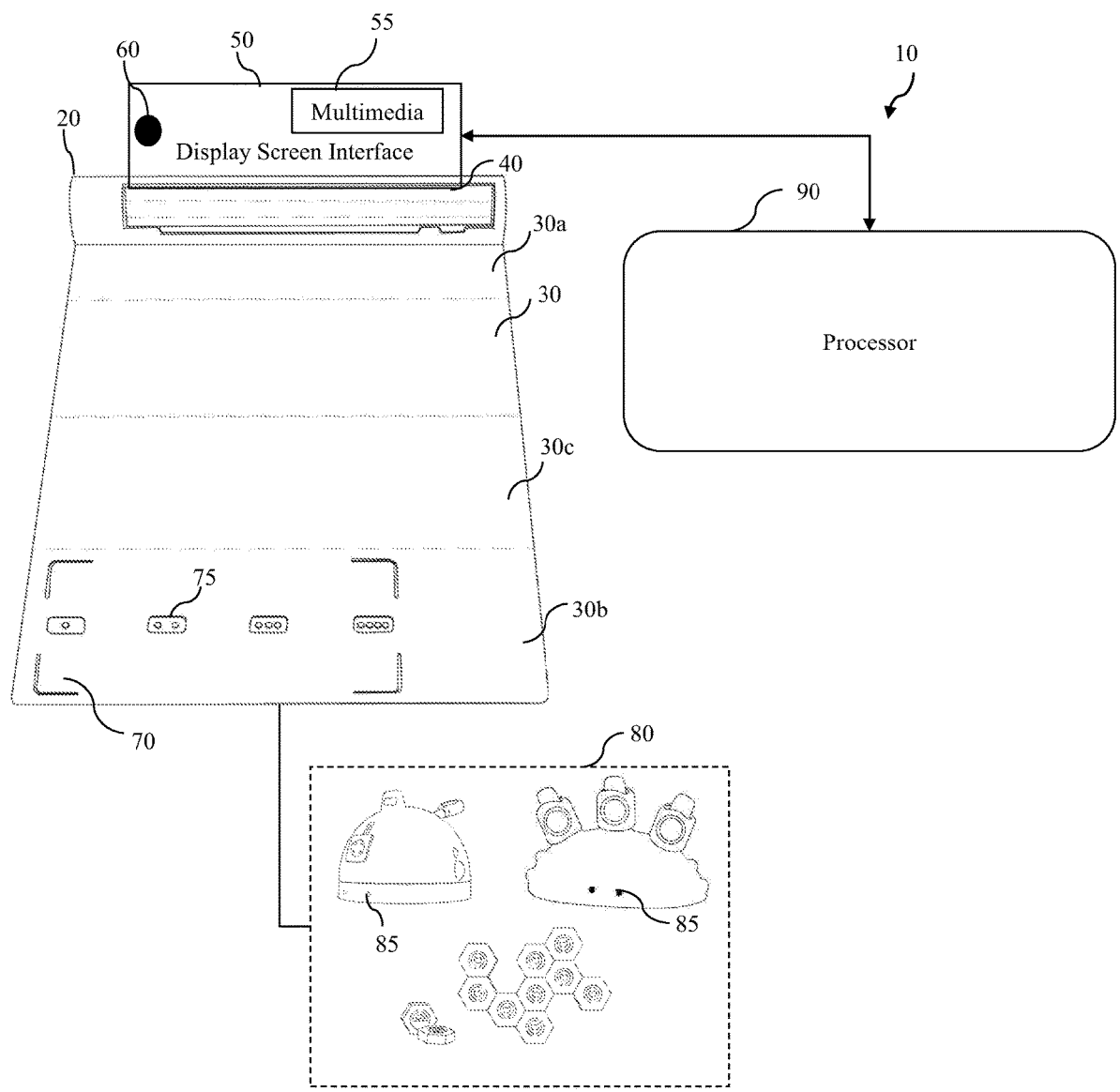
FIG. 1 is a block diagram representation of an interactive learning system in accordance with an embodiment of the present disclosure.

FIG. 1 is a block diagram representations of an interactive learning system 10 in accordance with an embodiment of the present disclosure. The system 10 includes a pad 20 which includes multiple sections 30. In one embodiment, the pad 20 which may be referred to a mat may be composed of rubber.

Further, the multiple sections 30 include a first section 30*a* and a second section 30*b*. The first section 30*a* includes a slot 40. A display screen interface 50 including an image capturing unit 60 is housed within the slot 40. Further, the second section 30*b* includes a pre-defined magnetic pattern 70 which is embedded within the pad at the second section 30*b*. In one embodiment, the slot 40 includes a spring to hold the display screen interface within the slot 40. In such embodiment, the display screen interface 50 may be placed vertically or upright at an appropriate angle from the pad 20.

In one specific embodiment, the image capturing unit 60 may include a camera embedded within the display screen interface. In one specific embodiment, the display screen interface 50 may be embedded within a user device. In one embodiment, the user device may be a portable computing device such as a laptop. In another embodiment, the user device may be a fixed computing device such as a desktop. In yet another embodiment, the user device may be a handheld portable device such as a tablet, a mobile phone, or the like.

In one exemplary embodiment, the multiple sections 30 may also include a mid section 30*c*. In such embodiment, the pad 20 may include multiple folding in between each of the multiple sections 30 which may be used to fold the pad 20 for portable purposes. In another exemplary embodiment, the second section 30*b* is placed at a pre-defined distance from the image capturing unit 60. The pre-defined distance may be a field of view of the image capturing unit 60.

In one embodiment, the second section 30*b* of the pad 20 may include one or more reference points 75 which may be represented in a form of set of dots on the pad 20. The set of dots may be considered as the corresponding one or more reference points 75 for the field of view of the image capturing unit 60.

Furthermore, the system 10 includes one or more interactive tools 80 which are operatively coupled to the second section 30*b*. In one embodiment, the one or more interactive tools 80 may include magnetic material which may be embedded within the corresponding one or more interactive tools 80. In such embodiment, placement of the one or more interactive tools 80 when placed on the corresponding one or more reference points 75 may be attached or positioned in place due to the magnetic material on the pad 20 and the one or more interactive tools 80. More specifically, in such embodiments, the one or more interactive tools 80 may be magnetically coupled to the second section 30*b* of the pad via magnetic material of the one or more interactive tools 80 and the magnetic material at the second section 30*b*.

Further, the one or more interactive tools 80 enables an interaction with at least one multimedia 55 being displayed on the display screen interface 50 upon having at least one movement of the one or more interactive tools 80 on the second section 30*b* of the pad 20.

In one exemplary embodiment, the one or more interactive tools 80 may include one of multiple patterns, multiple of designs, game equipment or a combination thereof. In such embodiment, the one or more interactive tools 80 may be configured in correspondence with the at least one multimedia 55 being displayed on the display screen interface 50. Furthermore, each of the one or more interactive tools 80 may include at least one tag point 85. The at least one tag point 85 may be of a pre-defined shape such as a circle, square, rectangle, or the like. The pre-defined shape may also include a corresponding pre-defined measure points. Further, when the one or more interactive tools 80 with the corresponding at least one tag point 85 is placed on the second section 30*b* of the pad 20, the at least one tag point 85 may act as a reference for the field of view of the image capturing unit 60. Furthermore, the system 10 includes one or more processors 90 operatively coupled to the pad 20.

Figure 2:
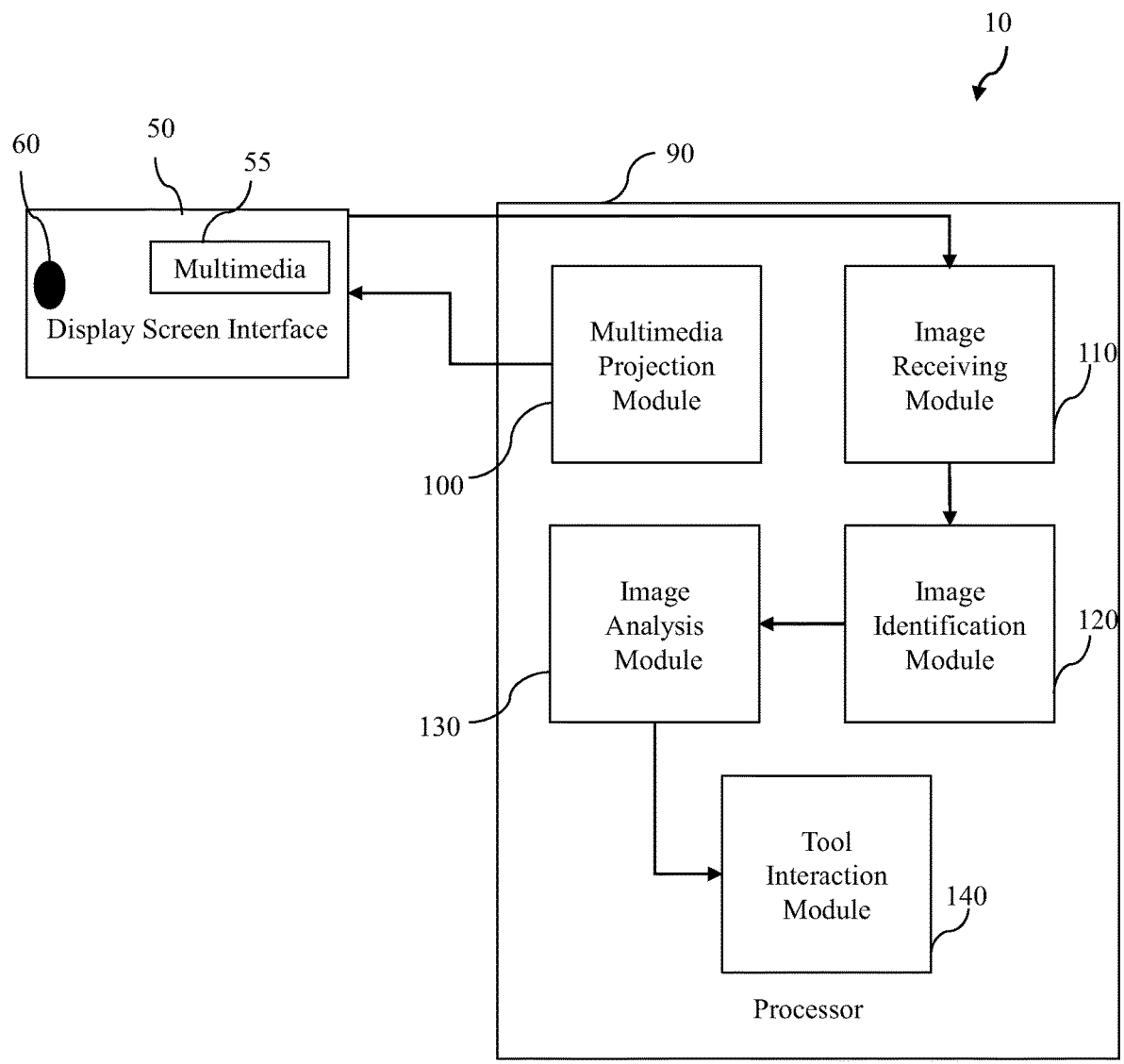
FIG. 2 is a block diagram representing a processor of FIG. 1 in accordance with an embodiment of the present disclosure.

FIG. 2 is a block diagram representing the processor of FIG. 1 in accordance with an embodiment of the present disclosure. The one or more processors 90 include a multimedia 55 projection module 100 to project the at least one multimedia 55 on the display screen interface 50 upon selection of the at least one multimedia 55 by a user. More specifically, the display screen interface 50 may display a list of multimedia 55, from which the user may select the at least one multimedia 55 of interest. Further, based on the selected at least one multimedia 55, the corresponding one or more interactive tools 80 may be used by the user to enable the interaction of the at least one multimedia 55 selected.

The one or more processors 90 also includes an image identification module 110 to identify a pattern formed by the one or more images representative of the at least one movement of the corresponding one or more interactive tools 80 received by an image receiving module 110. More specifically, as the one or more interactive tools 80 are operated by the user on the second section 30*b* of the pad 20, the image capturing unit 60 captures one or more images of the corresponding one or more interactive tools 80 in real time. The one or more images captured generates the pattern when synced together. The pattern generated is identified by the image identification module 120 to subsequently identify the at least one movement of the corresponding one or more interactive tools 80. Upon identification of the pattern, the pattern is the analysed by an image analysis module 130 using an image processing technique. In one exemplary embodiment, the at least one movement may be one of a linear movement, a circular movement, a rotational movement or a combination thereof. In one embodiment, the image processing technique may include cropping feel of the one or more images to minimise size of multiple pixels of the corresponding one or more images. Further, a gaussian blur technique is applied on one or more cropped images to reduce noise and eliminate additional images and/or environmental factors in the one or more images obtained by the image capturing unit 60.

Furthermore, one or more noise reduced images are converted from red, green and blue (RGB) to hue, saturation and value (HSV) images to obtain one or more hue images. In addition, the one or more noise reduced images are converted from red, green and blue (RGB) to grey scale to obtain one or more grey scale images. Furthermore, contrast edge detection processing technique is applied on the one or more hue images and the one or more grey scale images to obtain multiple edges from the corresponding one or more hue images and the one or more grey scale images.

The multiple edges obtained are further subjected to diluting to join multiple broken lines in the corresponding multiple edges to obtain one or more edge processed images. Further a pattern recognition technique is applied to the obtain one or more edge processed images to identify the pattern of the corresponding at least one tag point 85. In one embodiment, the pattern of the corresponding at least one tag point 85 may be a square, a circle, a rectangle, or the like. Further, a set of pre-defined filter values are applied to the one or more edge processed images to obtain multiple edges of interest. In one embodiment, the set of pre-defined filter values may include a height, a width, a length, an area.

Furthermore, a loop is created to match the multiple edges of interest using a set of pre-defined markers to obtain multiple matched edges. An orientation invariance technique is applied on the multiple matched edges or obtain multiple oriented edges. In one embodiment, the orientation may be to rotate each of the multiple edges by about 30 degree to match with the adjacent multiple edges. Consequently, colour inside edge counters of the multiple oriented edges are detected to determine if the obtained area if of interest of the interaction of the one or more interactive tools with the at least one multimedia 55 and to segregate between different one or more interactive tools 80.

Further, a frame to frame difference mapping is applied to determine the at least one movement of the one or more interactive tools 80 on the second section 30*b* of the pad 20. In one embodiment, the at least one movement may be determined upon calculating delta values in 'X', 'Y' and 'Z' directions. The rotation of the one or more interactive tools 80 may be obtained upon calculating an axis and angle of rotation of the one or more interactive tools 80.

The one or more processors 90 further includes a tool interaction module 140 to enable an interaction of the one or more interactive tools 80 as shown in FIG. 1 with the at least one multimedia 55 being displayed on the display screen interface 50 in real time based on the pattern analysed by the image analysis module 130. More specifically, as the user operates the one or more interactive tools 80 (as shown in FIG. 1), the image capturing unit 60 captures the one or more images of the one or more interactive tools 80 and transmits the one or more images captured to image identification module 120 to identify the pattern caused due to the at least one movement of the one or more interactive tools 80 which is analysed by the image analysis module 130 which enable the interaction between the one or more interactive tools 80 and the at least one multimedia 55 being displayed on the display screen interface 50.

In one exemplary embodiment, the tool interaction module 140 may track the at least one movement of the corresponding one or more interactive tools 80 based on the pattern analysed by the image analysis module 130, thereby enabling the real time interaction of the one or more interactive tools 80 with the at least one multimedia 55.

In one embodiment, the one or more processors 90 may further include a notification generation module to generate a notification if the one or more interactive tools 80 are not in field of view of the image capturing unit 60. In such embodiment, the notification may be one of a text notification, a voice notification, a multimedia 55 notification or the like.

Figure 3:
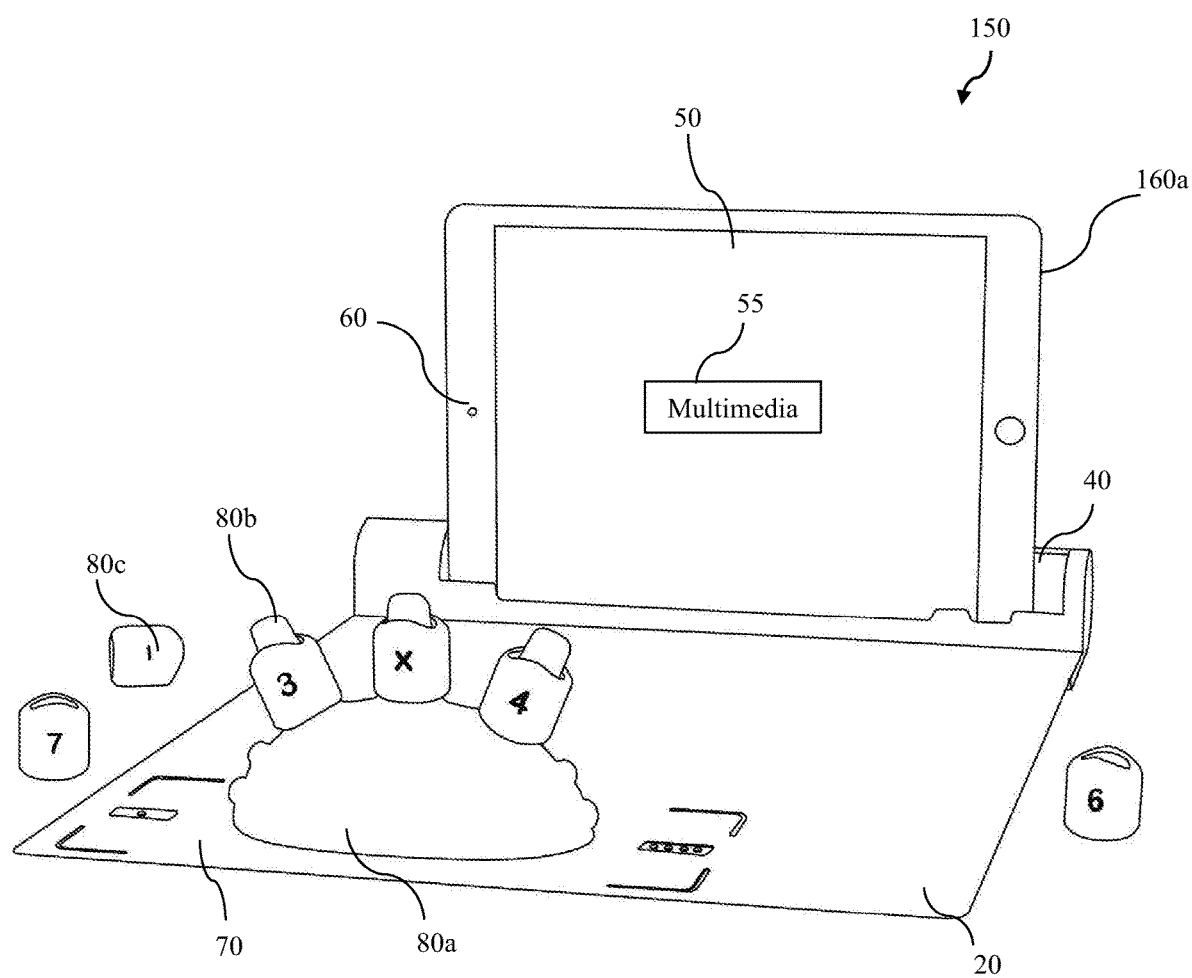
FIG. 3 is schematic representation of an exemplary embodiment representing a tablet as a computing device with multiple rings and multiple spikes being one or more interactive tools of FIG. 1 in accordance with an embodiment of the present disclosure.

FIG. 3 is schematic representation of an exemplary embodiment 150 representing the tablet as the computing device with multiple rings and multiple spikes being one or more interactive tools of FIG. 1 in accordance with an embodiment of the present disclosure. The tablet 160a is fixed to the slot 40 in the first section 30a. The display screen interface 50 of the tablet 160a is placed vertically to the pad 20 and having the camera 60 in field of view of the second section 30b. The interactive tool 80 includes a semi-circular base 80a on which the multiple spikes 80b is fabricated. The semi-circular base 80a includes magnetic material which is used to fix the interactive tool 80 with the pre-defined magnetic pattern on the second section 30b.

One or more of the multiple rings 80c are placed on the corresponding multiple spikes 80b as a gesture of interaction with the at least one multimedia 55 being displayed on the display screen interface 50. Furthermore, the user selects the at least one multimedia 55 to be displayed on the display screen interface 50. The multimedia 55 projection module 100 projects the at least one multimedia 55 on the display screen interface 50 of the tablet 160a. Further to the set of questioners being displayed on the display screen interface 50, the user adds one or more rings 80c on the corresponding multiple spikes 80b to generate a set of replays for the set of questioners of the at least one multimedia 55 being displayed. The camera 60 captures the images of the one or more rings 80c added by the user and the one or more images are received by the image receiving module 110 in real time. Further, the image identification module 120 identifies the pattern formed by the corresponding one or more rings 80c and transmits the same to the image analysis module 130. The identification module 120 identifies the pattern formed by the one or more rings 80c and is further analysed by the image analysis module 130 using the image processing technique. The analysed image is further mapped to the set of questioners and verified based on a set of pre-stored answers. Consequently, based on the analysed and verified data, the tool interaction module 140 enables the interaction of the one or more rings 80c with the at least one multimedia 55 being displayed on the display screen interface 50 in real time. Also, the movement of the multiple rings 80c on the corresponding multiple spikes 80b are tracked by the tool interaction module 140 in real time. In one embodiment, the multiple rings 80c may include numbers or operators.

Figure 4A:
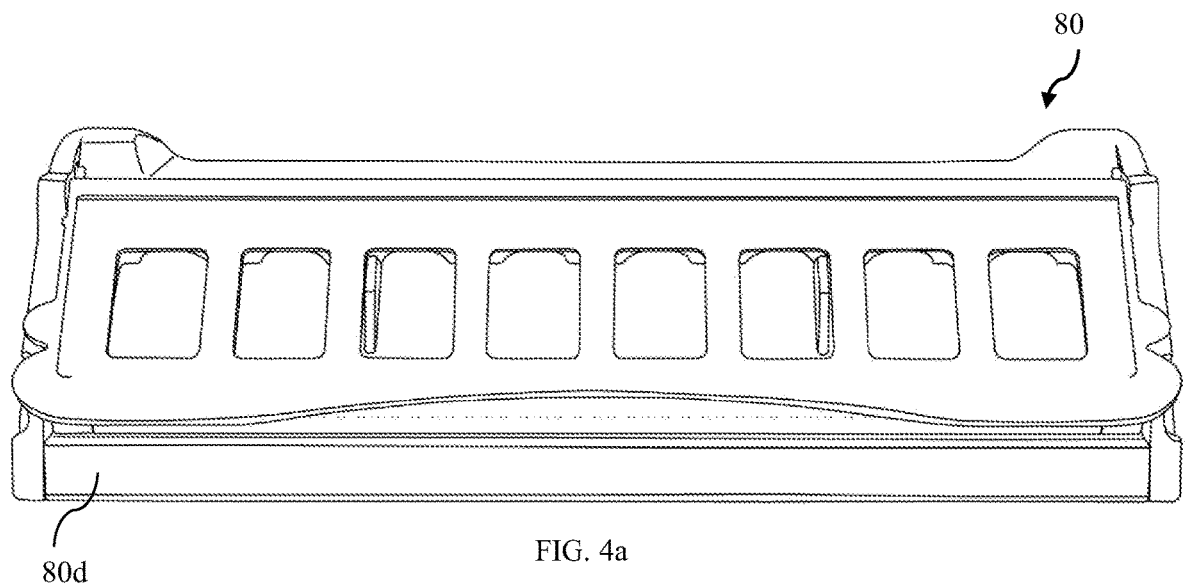
FIG. 4a and FIG. 4b are schematic representations of one or more interactive tools comprising multiple letters, of FIG. 1 in accordance with an embodiment of the present disclosure.
Figure 4B:
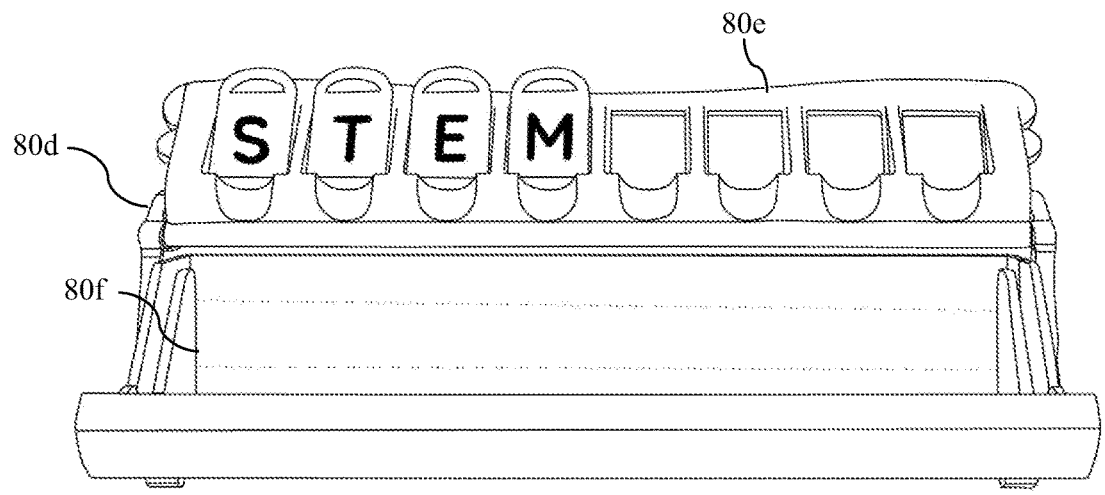

FIG. 4a and FIG. 4b are schematic representations of one or more interactive tools comprising multiple letters, of FIG. 1 in accordance with an embodiment of the present disclosure. The interactive tool 80 includes a stand 80d, a letter trunk 80f to hold one or more letter tiles, a tile placement stand 80e coupled to the letter trunk 80f to place the one or more letter tiles from the letter trunk 80f to enable the interaction as a set of solution for the set of questioners being displayed on the display screen interface 50 of the computing device. The one or more letter tiles placed on the tile placement stand 80e by the user is captured by the image capturing unit 60 of the computing device and the rest of the procedure follows as described above.

Figure 5A:
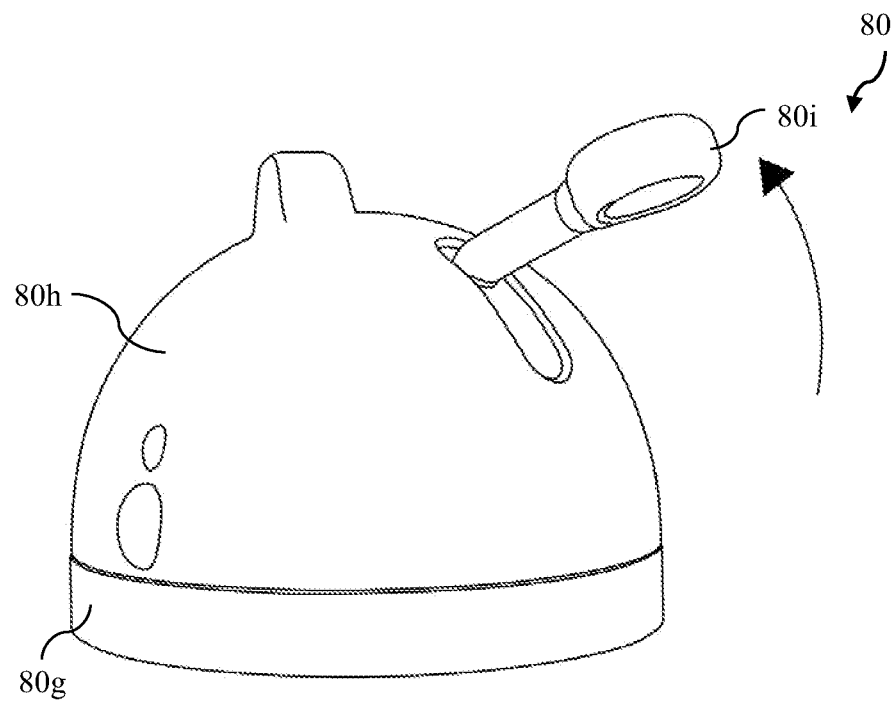
FIG. 5a and FIG. 5b are schematic representations of the one or more interactive tool being a slingshot, of FIG. 1 in accordance with an embodiment of the present disclosure.
Figure 5B:
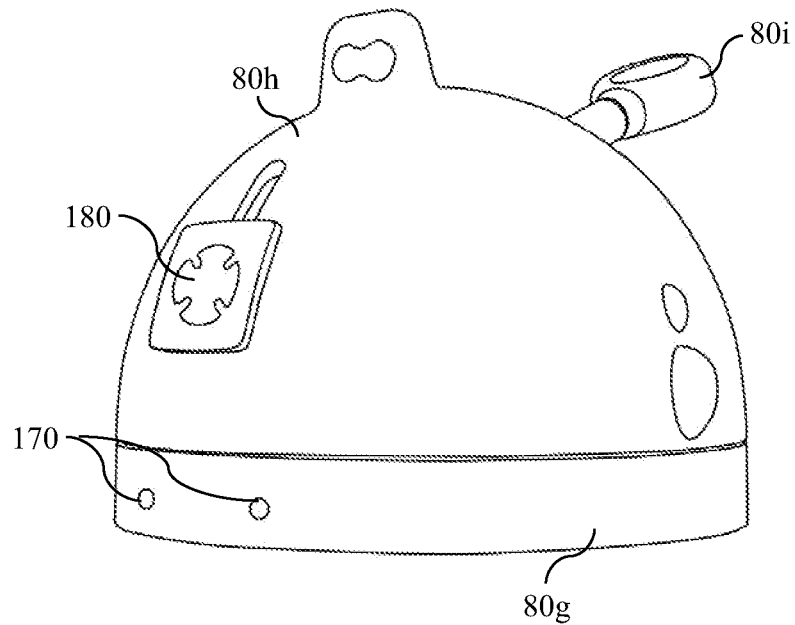

FIG. 5a and FIG. 5b are schematic representations of the one or more interactive tools 80 of (FIG. 1) being a slingshot, in accordance with an embodiment of the present disclosure. The sling shot 80 includes a base 80g, a rotatable top 80h, a sling 80i attached to the rotatable top 80h and an aim point 180 located at an opposite end of the sling 80i having a pre-set pattern for the image capturing unit 60 to capture and identity the angle of rotation of the rotatable top 80h and an angle of suspension at which the user aims the sling 80i to shoot based on the at least one multimedia 55 being displayed on the display screen interface 50 of the computing device. Also, the slingshot 80 includes multiple tag points 170 on the base 80g which is captured by the image capturing unit 60 and is used as a reference point for further interaction of the sling shot 80 with the at least one multimedia 55 on the display screen interface 50. The further analysis, interaction and tracking of the slingshot 80 is done as described above.

Figure 6:
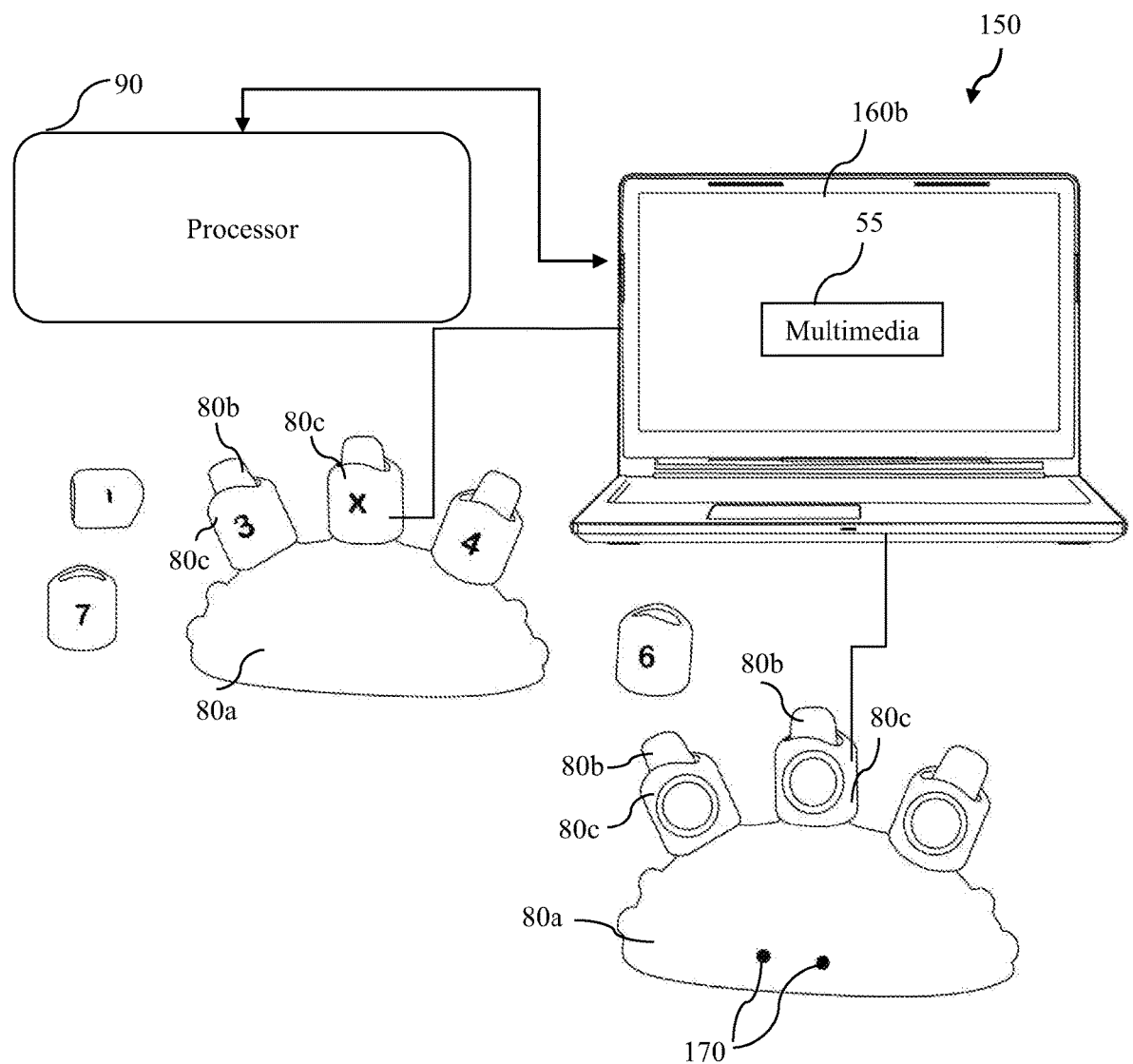
FIG. 6 is a schematic representation of yet another embodiment of the interactive learning system representing a laptop as the computing device, of FIG. 1 in accordance with an embodiment of the present disclosure.

FIG. 6 is a schematic representation of yet another embodiment of the interactive learning system 150 representing a laptop as the computing device, of FIG. 1 in accordance with an embodiment of the present disclosure. The image capturing unit 60 is embedded on the display screen interface 50 of the laptop 160b. The one or more interactive tools 80 are placed and operated on the second section 30b of the pad 20. The second section 30b of the pad 20 is kept in field of view of the image capturing unit 60 of the laptop 160b. The further analysis, interaction and tracking of the interactive tool 80 including multiple rings 80c and multiple spikes 80b is done as described above.

Figure 7:
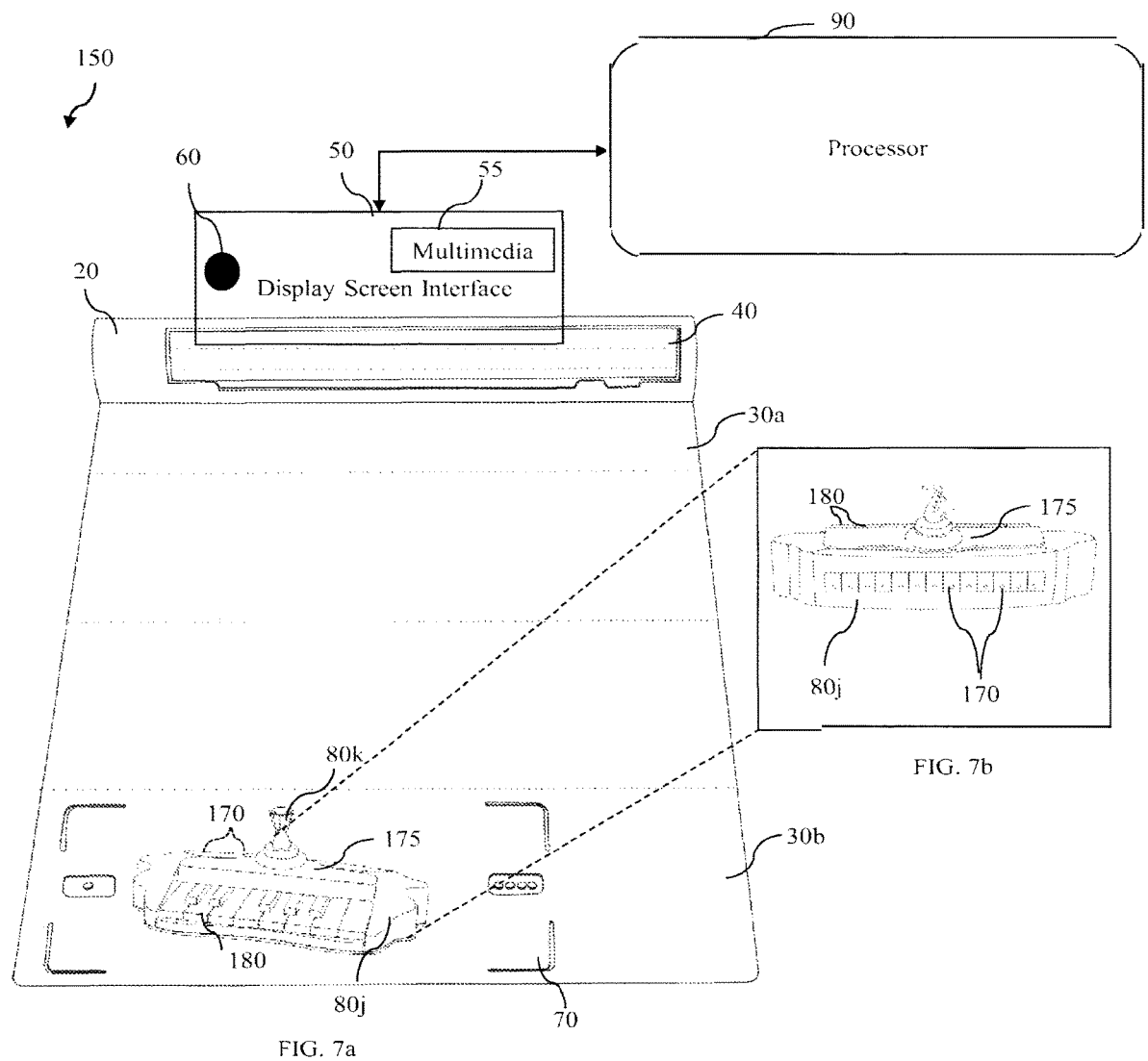
FIG. 7 includes FIG. 7a and FIG. 7b which are schematic representation of a system for interactive piano in a front view and a back view respectively in accordance of an embodiment of the present disclosure.

FIG. 7 includes FIG. 7a and FIG. 7b which are schematic representation of a system for interactive piano in a front view and a back view respectively accordance of an embodiment of the present disclosure. In one embodiment. the system 150 may include a pad 20 having multiple sections 30. The multiple sections 30 includes a first section 30a including a housing unit 40 which is substantially similar to slot (40 of FIG. 1). A display screen interface 50 with an image capturing unit 60 is housed within the housing unit 40. In one embodiment, the housing unit 40 includes a spring to hold a display screen interface 50 within the housing unit 40. In one embodiment, the image capturing unit 60 may be a camera embedded within the display screen interface 50 of a computing device. In one exemplary embodiment, the computing device may include a laptop, a tablet, a mobile device, or the like. The multiple sections 30 may also include a second section 30b. In one exemplary embodiment, the second section 30b is placed at a pre-defined distance from the image capturing unit 60, wherein the pre-defined distance comprises a field of view of the image capturing unit 60.

Furthermore, the system 150 includes an interactive piano 80j one of the one or more interactive tools 80 to enable an interaction with a multimedia 55 being displayed on the display screen interface 50 upon having a movement of multiple keys 180 of the interactive piano 80j. In one embodiment, the interactive piano 80j is magnetically coupled to the second section 30b. In such embodiment, the interactive piano 80j may be magnetically coupled through magnetic material on the second section 30b of the pad 20. In such embodiment, the second section 30b may include a pre-defined magnetic pattern which may be embedded within the pad 20. Further, the interactive piano 80j includes multiple keys 180.

In one exemplary embodiment, the interactive piano 80j may include a groove on a top surface 175 In such embodiment, the system 150 may further include one or more interactive instrumental tools 80k positioned on the groove. The one or more interactive instrumental tools 80k is operated by the user to select an instrument from a plurality of type of instruments based on an angle of rotation of the corresponding one or more interactive instrumental tools 80k on the groove by the user. In one embodiment, each of the one or more interactive instrumental tools 80k may correspond to one of the multiple type of instruments. The multiple type of instruments may include a percussion instrument, a woodwind instrument, a string instrument or a brass instrument.

The system 150 further includes one or more processors 90 (as shown in FIG. 2) operatively coupled to the pad 20. The one or more processors 90 include a multimedia 55 projection module 100 to project the multimedia 55 on the display screen interface 60 upon selection of the multimedia 55 by the user. The multimedia 55 is representative of one or more musical notes for the interactive piano 80*j*. Referring to the above embodiment, the one or more musical notes may be representative of the type of the instrument which may be selected by the user via the corresponding one or more interactive instrumental tools 80.

Furthermore, the one or more processors 90 include an image receiving module 110 to receive one or more key images representative of the movement of the multiple keys 180 of the interactive piano 80*j* captured by the image capturing unit 60 in real time. In one embodiment, each of the multiple keys 180 represent the corresponding one or more musical notes. In one exemplary embodiment, each of the multiple keys 180 may include a point tag 170 on the multiple key 180 which may be designed with specific dimensions. Further, as the one or more multiple keys 180 are operated by the user, an image of the corresponding point tag 170 is captured by the image capturing unit 60 and is transmitted to the image receiving module 110. In such embodiment, the point tag 170 would be facing the image capturing unit 60 (as shown in FIG. 7*a*). FIG. 7*a* is the front view of the interactive piano 80*j* from the user's view. The point tag 170 in view of the image capturing unit 60 is as shown in FIG. 7*b*. In another exemplary embodiment, the image receiving module 110 may receive one or more interactive instrumental images representative of the movement of the one or more interactive instrumental tools 80*k* captured by the image capturing unit 60 in real time.

The one or more processors 90 also includes an image identification module 120 to identify the one or more musical notes formed by the one or more key images representative of the movement of the corresponding multiple keys 180 of the interactive piano 80*j* received by the image receiving module 110. In one exemplary embodiment, the image identification module 120 may identify the type of instrument of the plurality of instruments based on the angle of rotation of the corresponding one or more interactive instrumental tools 80*k* on the groove.

The one or more processors 90 also includes an image analysis module 130 to analyse the one or more musical notes identified by the image identification module via an image processing technique. More specifically, the one or more key images of the multiple keys 180 of the interactive piano 80*j* is operated by the user, and the corresponding one or more key images is captured by the image capturing unit 60 and the corresponding key tag 170 of each of the multiple keys 180 operated is identified and analysed to obtain the one or more musical notes. Further, the one or more musical notes analysed is compared with pre-stored musical notes to play the one or more musical notes in real time. In one embodiment, the computing device may include at least one speaker through which the one or more musical notes identified may be played in real time as and when the user is operating the multiple keys on the interactive piano.

Furthermore, the one or more processors 90 includes a tool interaction module 140 to enable an interaction of the interactive piano 80*j* with the multimedia 55 being displayed on the display screen interface 50 in real time based on the one or more musical notes analysed by the image analysis module 130. In one embodiment, the tool interaction module 140 may track the movement of the interactive piano 80*j* and the one or more interactive instrumental tools 80*k* based on the one or more musical notes analysed.

Figure 8:
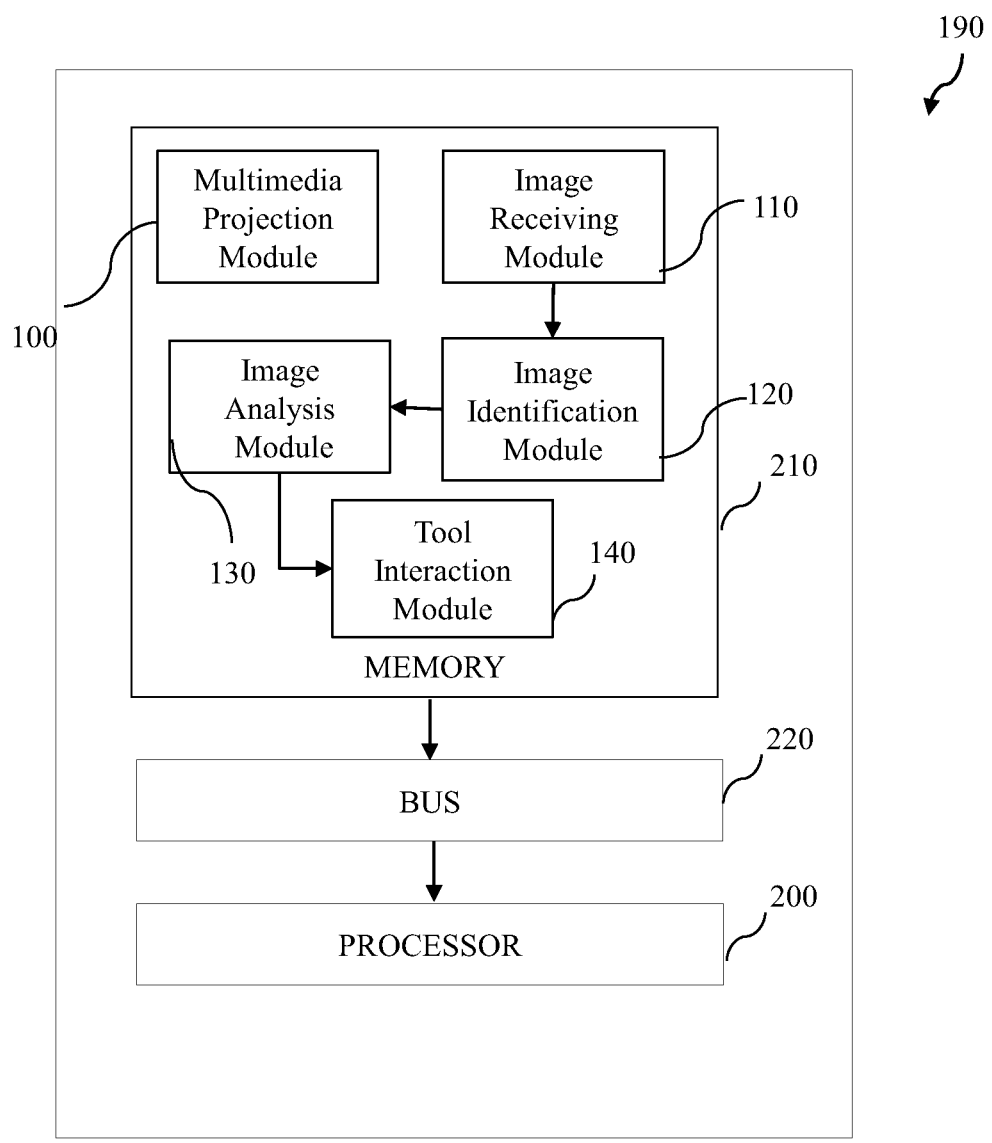
FIG. 8 is a block diagram of a computer 140 or a server in accordance with an embodiment of the present disclosure.

FIG. 8 is a block diagram of a computer 190 or a server in accordance with an embodiment of the present disclosure. The server includes processors 200, and memory 210 operatively coupled via a bus 220. The processors 200, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

Figure 9:
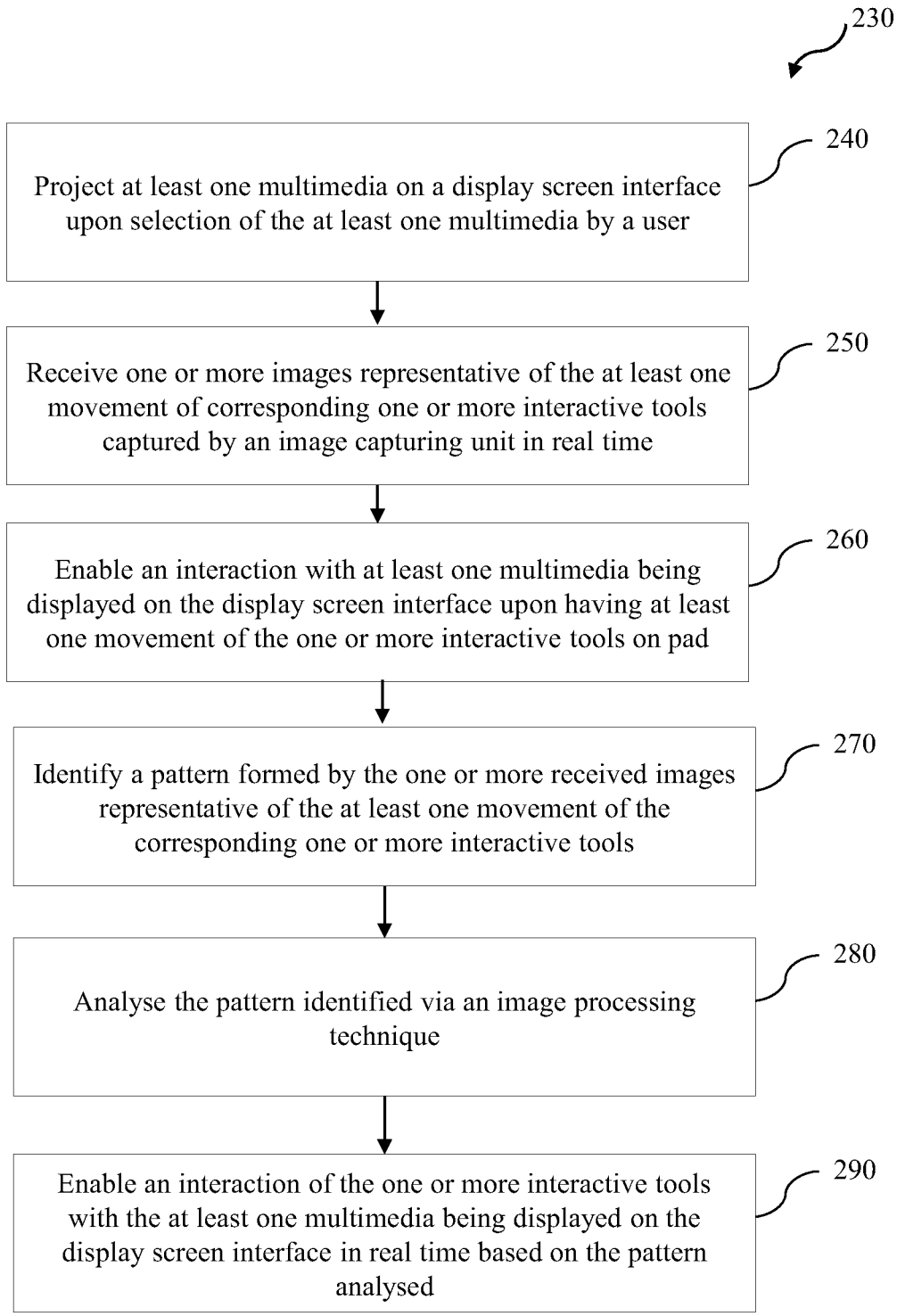
FIG. 9 is a flow chart representing the steps involved in a method for interactive learning in accordance with an embodiment of the present disclosure.

The memory 210 includes a plurality of modules of a system of FIG. 1 and FIG. 7 in the form of executable program which instructs the processor 200 to perform the method steps illustrated in FIG. 9. The memory 210 has following modules: a multimedia 55 projection module 100, an image receiving module 110, an image identification module 120, an image analysis module 130 and a tool interaction module 140.

The multimedia projection module 100 is configured to project the at least one multimedia on the display screen interface upon selection of the at least one multimedia by a user. The image receiving module 110 is configured to receive one or more images representative of the at least one movement of the corresponding one or more interactive tools captured by the image capturing unit in real time. The image identification module 120 is configured to identify a pattern formed by the one or more images representative of the at least one movement of the corresponding one or more interactive tools received by the image receiving module. The image analysis module 130 is configured to analyse the pattern identified by the image identification module via an image processing technique. The tool interaction module 140 is configured to enable an interaction of the one or more interactive tools with the at least one multimedia being displayed on the display screen interface in real time based on the pattern analysed by the image analysis module.

Computer memory 210 elements may include any suitable memory devices for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 200.

FIG. 9 is a flow chart representing the steps involved in a method 230 for interactive learning in accordance with an embodiment of the present disclosure. The method 230 includes projecting at least one multimedia on a display screen interface upon selection of the at least one multimedia by a user in step 240. In one embodiment, projecting the at least one multimedia includes projecting the at least one multimedia by a multimedia projection module.

The method 230 also includes receiving one or more images representative of the at least one movement of corresponding one or more interactive tools captured by an image capturing unit in real time in step 250. In one embodiment, receiving the one or more images may include receiving the one or more images by an image receiving module. In another embodiment, receiving the one or more images may include receiving the one or more images captured by a camera embedded within the display screen interface. In one exemplary embodiment, receiving the one or more images representative of the at least one movement may include receiving the one or more images representative of one of a linear movement, a circular movement, a rotational movement or a combination thereof.

In one specific embodiment, receiving the one or more images representative of the at least one movement of the corresponding one or more interactive tools may include receiving the one or more images upon operating the one or more interactive tools on a second section of multiple sections of a pad. In such embodiment, the second section may be in field of view of the image capturing unit. Also, the image capturing unit may be fixed to a slot on a first section of the multiple sections of the pad.

Furthermore, the method 230 includes enabling an interaction with at least one multimedia being displayed on the display screen interface upon having at least one movement of the one or more interactive tools on pad in step 260. In one embodiment, enabling the interaction may include enabling the interaction by one or more interactive tools. In such embodiment, enabling the interaction by one or more interactive tools may include enabling the interaction by one of multiple patterns, multiple designs, game equipment or a combination thereof.

The method 230 also includes identifying a pattern formed by the one or more received images representative of the at least one movement of the corresponding one or more interactive tools in step 270. In one embodiment, identifying the pattern may include identifying the pattern by an image identification module. In one exemplary embodiment, the method may further include identifying at least one tag point of the corresponding one or more interactive tools for obtaining a reference point for the interaction of the one or more interactive tools with the at least one multimedia.

The method 230 also includes analysing the pattern identified via an image processing technique in step 280. In one embodiment, analysing the pattern may include analysing the pattern by an image analysis module. The method 230 also includes enabling an interaction of the one or more interactive tools with the at least one multimedia being displayed on the display screen interface in real time based on the pattern analysed in step 290. In one embodiment, enabling the interaction of the one or more interactive tools may include enabling the interaction by a tool interaction module. In one exemplary embodiment, the method 230 may further include tracking the at least one movement of the corresponding one or more interactive tool based on the pattern analysed. In such embodiment, tracking the at least one movement may include tracking the at least one movement by the tool interaction module.

In one embodiment, the method 230 may further include generating a notification when the one or more interactive tools are not in a field of view of the image capturing unit. In such embodiment, generating the notification may include generating one of a text notification, a voice notification, a multimedia notification or the like.

Various embodiments of the present disclosure enable the interactive learning system to enable the user to have a hands-on experience with the interaction associated to education or entertainment through the interactive tool and the display screen interface. Also, the user experience is limited extended to multiple approaches, thereby making the system more reliable. Also, accuracy of tracking the interactive tools in real time is high due to implementation of different image processing techniques.

Also, the system adapts to different in-room lighting conditions to improve detection of the interactive tools. The system also detects sequential addition and deletion of the interactive tools which enables in understanding which interactive tool was recently added or removed. The detection of the interactive tool helps in identifying faded or misprinted interactive tool by generating a notification to the user, thereby helping the user to replace the tool. In addition, the system also detects movement of tactile elements to keep a track on the user input. The system also detects movement of tactile elements to see the 360° orientation of the tactile element.

Further, as the system also generated the notification if the interactive tool is outside or partially within the field of view, thereby making the system more reliable. The system also detects and tracks multiple interactive tools, detects any movement or misplacement of the pad or/and the interactive tool from the field of view of the image capturing unit which enable accuracy in detection and interaction of the interactive tool with the at least one multimedia on the display screen interface. Also, the system uses colour in the one or more images captured, also detects the face and scans the detected face of the corresponding interactive tool. Also, the display screen interface is oriented between 85-90 degree, which is almost in the up-right position. As used herein, the term 'face' is defined as a side of the interactive tool.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. An interactive learning system comprising:
a pad comprising a plurality of sections,
wherein the plurality of sections comprises:
a first section comprising a slot, wherein a display screen interface comprising an image capturing unit is housed within the slot; and
a second section;
one or more interactive tools operatively coupled to the second section, wherein the one or more interactive tools are configured to enable an interaction with at least one multimedia being displayed on the display screen interface upon having at least one movement of the one or more interactive tools on the second section of the pad; and
one or more processors operatively coupled to the pad, wherein the one or more processors comprises:

a multimedia projection module configured to project the at least one multimedia on the display screen interface upon selection of the at least one multimedia by a user;

an image receiving module configured to receive one or more images representative of the at least one movement of the corresponding one or more interactive tools captured by the image capturing unit in real time;

an image identification module configured to identify a pattern formed by the one or more images representative of the at least one movement of the corresponding one or more interactive tools received by the image receiving module;

an image analysis module configured to analyze the pattern identified by the image identification module via an image processing technique; and a tool interaction module configured to enable an interaction of the one or more interactive tools with the at least one multimedia being displayed on the display screen interface in real time based on the pattern analyzed by the image analysis module.

2. The interactive learning system as claimed in claim 1, wherein the image capturing unit comprises a camera embedded within the display screen interface.

3. The interactive learning system as claimed in claim 1, wherein the second section is placed at a pre-defined distance from the image capturing unit, wherein the pre-defined distance comprises a field of view of the image capturing unit.

4. The interactive learning system as claimed in claim 1, wherein the slot comprises a spring configured to hold the display screen interface within the slot.

5. The interactive learning system as claimed in claim 1, wherein the one or more interactive tools comprises one of a plurality of patterns, a plurality of designs, game equipment or a combination thereof.

6. The interactive learning system as claimed in claim 1, wherein the one or more interactive tools comprises at least one tag point, wherein the at least one tag point is placed in sync with corresponding one or more mark points to create a reference point for the interaction of the one or more interactive tools with the at least one multimedia.

7. The interactive learning system as claimed in claim 1, wherein the tool interaction module is configured to track the at least one movement of the corresponding one or more interactive tool based on the pattern analysed by the image analysis module.

8. A method for interactive learning comprising:
projecting, by a multimedia projection module, at least one multimedia on a display screen interface upon selection of the at least one multimedia by a user;
receiving, by an image receiving module, one or more images representative of the at least one movement of corresponding one or more interactive tools captured by an image capturing unit in real time, wherein receiving the one or more images representative of the at least one movement of corresponding one or more interactive tools comprises:
enabling, by one or more interactive tools, an interaction with at least one multimedia being displayed on the display screen interface upon having at least one movement of the one or more interactive tools on pad;
identifying, by an image identification module, a pattern formed by the one or more received images representative of the at least one movement of the corresponding one or more interactive tools;
analyzing, by an image analysis module, the pattern identified via an image processing technique; and enabling, by a tool interaction module, an interaction of the one or more interactive tools with the at least one multimedia being displayed on the display screen interface in real time based on the pattern analyzed.

9. The method as claimed in claim 8, wherein receiving the one or more images representative of the at least one movement of the corresponding one or more interactive tools captured by the image capturing unit in real time comprises receiving the one or more images captured by a camera embedded within the display screen interface.

10. The method as claimed in claim 8, further comprises tracking, by the tool interaction module, the at least one movement of the corresponding one or more interactive tool based on the pattern analysed.

11. A system for interactive piano comprising:
a display screen interface comprising an image capturing unit housed within a housing unit;
an interactive piano operatively coupled to the display screen, wherein the interactive piano comprises a plurality of keys, the interactive piano configured to enable an interaction with a multimedia being displayed on the display screen interface upon having a movement of the plurality of keys of the interactive piano; and
one or more processors operatively coupled to the interactive piano, wherein the one or more processors comprises:
a multimedia projection module configured to project the multimedia on the display screen interface upon selection of the multimedia by a user, wherein the multimedia is representative of one or more musical notes of the interactive piano;
an image receiving module configured to receive one or more key images representative of the movement of the plurality of keys of the interactive piano captured by the image capturing unit in real time;
an image identification module configured to identify the one or more musical notes formed by the one or more key images representative of the movement of the corresponding plurality of keys of the interactive piano received by the image receiving module;
an image analysis module configured to analyze the one or more musical notes identified by the image identification module via an image processing technique; and
a tool interaction module configured to enable an interaction of the interactive piano with the multimedia being displayed on the display screen interface in real time based on the one or more musical notes analyzed by the image analysis module.

12. The system as claimed in claim 11, wherein the image capturing unit comprises a camera embedded within the display screen interface.

13. The system as claimed in claim 11, wherein the housing unit comprises a spring configured to hold the display screen interface within the housing unit.

14. The system as claimed in claim 11, wherein the tool interaction module is configured to track the movement of the corresponding plurality of keys of the interactive piano based on the one or more musical notes analysed by the image analysis module.

15. The system as claimed in claim 11, wherein the interactive piano comprises a groove.

16. The system as claimed in claim 15, further comprises one or more interactive instrumental tools positioned on the groove, wherein the one or more interactive instrumental tools is operated by the user to select an instrument from a plurality of type of instruments based on an angle of rotation of the corresponding one or more interactive instrumental tools on the groove by the user.

17. The system as claimed in claim 16, wherein each of the one or more interactive instrumental tools corresponds to one of the plurality of type of instruments, wherein the plurality of type of instruments comprises a percussion instrument, a woodwind instrument, a string instrument or a brass instrument.

18. The system as claimed in claim 16, wherein the image receiving module is configured to receive one or more interactive instrumental images representative of the movement of the one or more interactive instrumental tools captured by the image capturing unit in real time.

19. The system as claimed in claim 16, wherein the image identification module is configured to identify the type of instrument of the plurality of instruments based on the angle of rotation of the corresponding one or more interactive instrumental tools on the groove by the image receiving module.

20. The system as claimed in claim 11, wherein the tool interaction module configured to enable the interaction of the interactive piano with the multimedia being displayed on the display screen interface in real time based using one of a virtual reality technique, an augmented reality technique or a mixed reality technique.

* * * * *